UNITED STATES PATENT OFFICE.

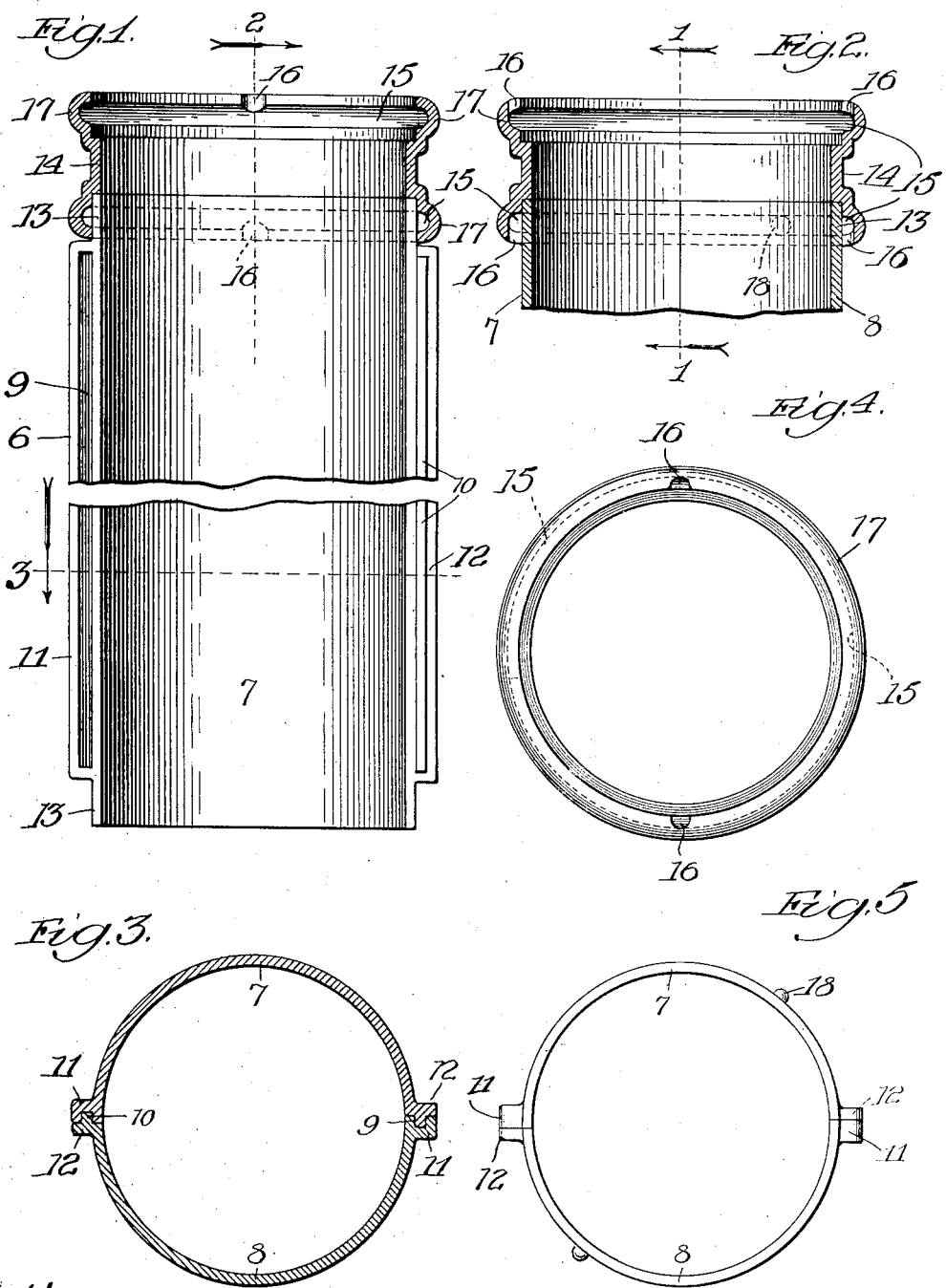

FLOYD DOW, OF WYANET, ILLINOIS, ASSIGNOR OF ONE-HALF TO LLEWELLYN D. EDMINSTER, OF WYANET, ILLINOIS.

PIPE STRUCTURE.

1,350,073.  Specification of Letters Patent.  Patented Aug. 17, 1920.

Application filed May 10, 1919. Serial No. 296,242.

*To all whom it may concern:*

Be it known that I, FLOYD DOW, a citizen of the United States, residing at Wyanet, in the county of Bureau and State of Illinois, have invented a new and useful Improvement in Pipe Structure, of which the following is a specification.

My invention relates more particularly to pipe structures formed of pipe members connected together at adjacent ends, and the pipe members being formed in sections each preferably half cylindrical, the joints between each extending lengthwise of the pipe members, such a character of construction being desirable under some conditions where the pipe members are cast from metal.

My primary object is to provide a pipe structure of the character above referred to wherein by a novel, simple and economical construction of means, the pipe sections may be held tightly together and adjacent pipe members be rendered relatively rotatable, and other objects as will appear from the following description:—

Referring to the accompanying drawings:—

Figure 1 is a section taken at the line 1—1 on Fig. 2 and viewed in the direction of the arrows, this view showing the coupling in section and the half-cylindrical pipe section in elevation. Fig. 2 is a section taken at the line 2 on Fig. 1 and viewed in the direction of the arrow, showing the upper end of the construction illustrated in Fig. 1. Fig. 3 is a section taken at the line 3 on Fig. 1 and viewed in the direction of the arrow. Fig. 4 is a plan view of the structure shown in Fig. 1, and Fig. 5 a plan view of the structure of Fig. 2 with the coupling removed.

One of the similar pipe members employed is represented at 6, these pipe members which are either straight or of elbow or angle form and of any length desired, to suit the particular condition of use presented, being each formed of sections, each preferably in the form of a half-cylinder, as represented of the sections 7 and 8 forming the illustrated pipe-member 6. The sections 7 and 8 are so formed as to provide a tight joint extending lengthwise thereof when these pipes are assembled to form the pipe member, which in the construction shown is cylindrical, it being preferred that these joints be formed by casting, where pipe members are produced by the casting operation, a longitudinally extending groove 9, along one edge of each pipe section and a longitudinally extending tongue 10 along the other, diametrically opposed, edge, the tongues 10 being adapted to enter the opposed grooves 9 in the opposed pipe sections, as represented in Fig. 3, to form tight joints between these sections, the grooves 9 and tongues 10 being preferably formed in ribs 11 and 12 provided on the exterior of the pipe sections, these ribs by preference reaching short of the ends of the pipe member as represented of the one in Fig. 1, the pipe member thereby presenting at opposite ends the cylindrical portions 13.

The pipe sections 7 and 8 are held together in the assembled position referred to, by ring-like structures forming couplings which in addition to holding the pipe sections together, form means for connecting together the adjacent ends of pipe members in a manner to render them relatively rotatable. In the drawings I have illustrated a desirable form of such a coupler, this coupler being represented at 14 and being provided at its opposite ends on its inner surface with circumferentially disposed grooves 15, with notches 16 opening into these grooves through the opposite ends of the coupling. The coupling 14 is preferably cast and by preference its ends are of bead form as represented at 17 and in which the grooves 15 are located. The notches 16 at each end of the coupling 14 may be diametrically opposed, or otherwise disposed in spaced relation, about the circular ends of the coupling, these notches coöperating with studs 18 provided on the cylindrical portions 13 of the pipe member 6, the studs 18 being spaced apart about the circumference of the pipe member 6 a distance corresponding to the spacing of the notches 16, whereby the studs 18 may enter the notches 16 at the end of the coupling 14 and pass into registration with the groove 15, after moving the coupler and pipe member into telescoping condition, the studs 18 entering the groove 15 and interlocking with the unnotched portion thereof upon relatively rotating the coupler 14 and pipe member 6.

In the assembling of the parts of the structure the sections 7 and 8 are joined together by entering the tongues 10 in the grooves 9 as represented in Fig. 3 and couplings such as those shown at 14 are applied to the opposite ends of the pipe member thus produced, to firmly secure these pipe sections together and form a rotatable connection between the coupler 14 and pipe member, it being understood that the structure shown in Fig. 1 is merely illustrative of the assembly of the pipe sections relative to each other and with a coupling and that in practice another one of the pipe members 6 of any form desired would connect with the upper end of the coupling 14 and this arrangement would be continued for the full length of the pipe structure desired to be produced.

It will be understood from the foregoing that the various elements comprising the pipe structure may be assembled quickly and when desired quickly disassembled by relatively rotating the pipe members and couplings. Furthermore, the feature of the pipe members and couplings being relatively rotatable, adapts the pipe members, whether of angle or elbow form or provided with deflected ends, to extend in the desired positions relative to each other, which is of especial value in connection with the structure when used for stove-pipe purposes; and while I have referred to the use of the invention in connection with the production of stove pipes, it will be understood that it may be utilized in pipe structures for other purposes as well.

What I claim as new and desire to secure by Letters Patent is:—

1. A pipe structure formed of a plurality of pipe members disposed in end to end relation, and each formed of sections extending lengthwise thereof, and means engaging the ends of said pipe members operating to hold said pipe sections in assembled condition and permit of the relative rotation of adjacent pipe members.

2. A pipe structure formed of a plurality of pipe members disposed in end to end relation, and each formed of sections extending lengthwise thereof, and means engaging the ends of said pipe members operating to hold said pipe sections in assembled position and interlock with said pipe members to prevent longitudinal separation thereof except at a predetermined position of said members relative to said means and permitting relative rotation of said pipe members.

3. A pipe structure formed of a plurality of pipe members disposed in end to end relation and each formed of sections extending lengthwise thereof and ring-shaped coupling members surrounding the ends of said pipe members and operating to hold said sections in assembled condition and connect adjacent pipe members together and permit relative rotation of said coupling members and pipe members.

4. A pipe structure formed of a plurality of pipe members disposed in end to end relation and each formed of sections extending lengthwise thereof and having studs on their circumferences at the ends thereof, and ring-shaped coupling members surrounding the ends of said pipe members and holding said sections in assembled condition and connecting adjacent pipe members together, said coupling members containing circumferentially disposed grooves on their inner surfaces at their ends, with notches opening into said grooves and through the ends of said coupling members for registration with said studs and through which notches the studs of adjacent pipe members enter said grooves for interlocking with the walls of the latter, in the assembling operation.

5. A pipe structure formed of a plurality of pipe members disposed in end to end relation and each formed of sections extending lengthwise thereof, said sections at the lengthwise extending joints therebetween being relatively overlapped, and means engaging the ends of said pipe members operating to hold said pipe sections in assembled condition and permit of the relative rotation of adjacent pipe members.

6. A pipe structure formed of a plurality of pipe members disposed in end to end relation and each formed of sections extending lengthwise thereof, each of said sections presenting a groove along one edge and a tongue along its opposite edge extending lengthwise of the section, with the tongues of opposing sections extending into the opposed grooves thereof, and means engaging the ends of said pipe members operating to hold said pipe sections in assembled condition and permit of the relative rotation of adjacent pipe members.

FLOYD DOW.